United States Patent Office 3,347,566
Patented Oct. 17, 1967

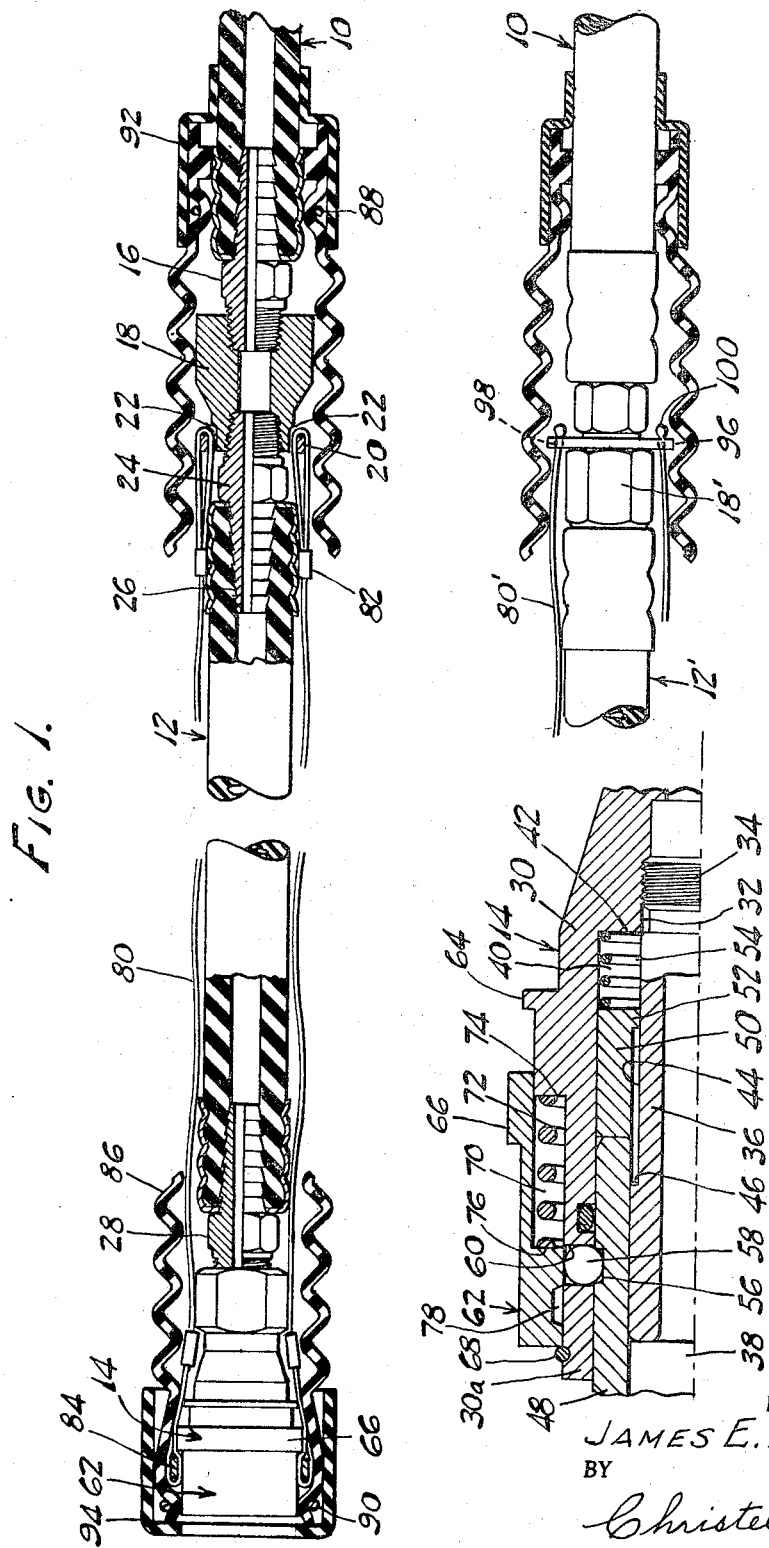

3,347,566
BREAKAWAY COUPLING ASSEMBLY
James E. Nelson, Williamsville, N.Y., assignor to Scott Aviation Corporation, Lancaster, N.Y., a corporation of New York
Filed Oct. 26, 1964, Ser. No. 406,287
6 Claims. (Cl. 285—1)

This invention relates to improvements in breakaway couplings for life support lines such as are used in breathing equipment.

In many industrial operations workers must perform their duties in an atmosphere unsuitable for breathing or which may be noxious or actually inflammable. In such cases the workers must continually wear protective face masks connected to flexible tubes or pipelines for conveying to the mask from a source outside of the working area either pure air or oxygen as such.

Such breathing fluid supply lines are flexible, as stated, and conventionally are connected to a regulator attached to a harness on the worker. A breathing tube extends from the regulator to the mask. In the event of an explosion or threatened explosion or the development of some other situation requiring that the worker get out of the area quickly it is highly important that the worker free himself from the supply line without delay. The couplings at present employed for connecting the supply line to the regulator are designed to be easily manipulated by hand. However, in the excitement which may develop when a situation arises making it imperative that the worker get out of the area, the worker may panic, start to run and forget to manipulate the disconnect coupling. In such event, the normally elastic supply line will be rapidly stretched by the fleeing worker and will then quickly react, abruptly restraining the worker perhaps throwing him to the ground, causing possible injury and delaying his escape.

In view of the foregoing, a principal object of the present invention is to provide a life support line coupling having a manually operable disconnect and normally inoperative means responsive to a predetermined abnormal force to actuate the disconnect automatically in its intended manner, the coupling containing an elastic section whereby in an emergency the disconnection of the supply line from the worker will not depend upon manual manipulation of a disconnect coupling.

Another object of this invention is to provide a means of accomplishing the foregoing utilizing any conventional or standard manually operable quick disconnect coupling of the push-pull actuation type, whereby the disconnect becomes automatic in operation under the circumstances above referred to while also being manually operable in the normally intended manner.

Another object of the invention is to provide the foregoing in a breakaway coupling which will not increase the weight of the life support line to any appreciable extent.

In one aspect thereof, a coupling of my invention is characterized by the provision of a normally slack cable extending lengthwise of an elastic coupling section, to the wearer, which cable is of greater length than the unstretched elastic section but will straighten out to its full length and thereafter apply the necessary actuating pull to disconnect the coupling when the elastic section is stretched beyond the limit permitted by the cable.

Other objects, advantages and characterizing features of my invention will become apparent from the ensuing detailed description of certain illustrative embodiments thereof, taken in connection with the accompanying drawing depicting the same wherein:

FIG. 1 is a view partly in elevation and partly in longitudinal section showing a disconnect coupling of my invention attached to a supply line, the elastic section of the coupling being broken away for ease of illustration;

FIG. 2 is a longitudinal quarter sectional view, on an enlarged scale, through the conventional, manually operable disconnect section of the coupling; and FIG. 3 is a fragmentary view, similar to that of FIG. 1 but illustrating another or alternate means of attaching the slack cables at the supply line end of the coupling.

Referring now in detail to the illustrative embodiments of my invention depicted in the accompanying drawing, the numeral 10 designates a conventional fluid supply line from, for example a source of breathing fluid, not shown. Supply line 10 is connected to the coupling of my invention which includes a tubular elastic section 12 and a disconnect coupling which is generally designated 14. The male coupling portion 38, 48 (FIG. 2) of disconnect 14 which can be any conventional push-pull type of disconnect, is attached for example to a strain relieving harness, not shown, worn by the user. The coupling disconnect is connected, for example, to a demand regulator which is in turn connected to a mask through a breathing line, or to a pressure suit. Since these connections and arrangements are known and are not, per se, a part of my invention, they are not shown.

The end of supply line 10, which is flexible and usually formed of a suitable elastic material such as rubber or a composition of rubber or plastic, is secured to a tubular nipple 16 connected to a pipe threaded adapter 18 which also is constructed to hold the hereinafter described slack cables. In the construction shown the adapter and cable holder 18 is provided on the coupling end with an encircling flange or collar 20 having two or more slots 22 formed therethrough and equidistantly spaced therearound, to receive the cables.

The numeral 24 designates a tubular nipple in the form of a conventional male barbed hose fitting, threaded at one end into adapter 18 as illustrated and having its opposite, barbed end 26 secured in an end of the elastic coupling tube 12, as shown. At its opposite end, coupling tube 12 is connected by a hose fitting 28 to the quick disconnect coupling 14.

In the illustrated form, the female portion of disconnect 14 comprises an elongated body 30 the forward end of which is connected with hose fitting 28. Body 30 has an axial bore 32 therethrough and has secured in the forward end portion of bore 32 an internal check valve unit 34 which, when the disconnect parts are coupled or connected, is maintained in open position by an axially slidable sleeve 36 which is held in place and against rearward movement by a plunger 38 carried by the male portion of the disconnect and through which fluid passes to the user.

Bore 32 is counterbored to an enlarged diameter rearwardly of check valve unit 34, as indicated at 40, thus providing a rearwardly facing shoulder 42. Sleeve 36 is of slightly reduced outside diameter from its forward end through a portion of its length, as indicated at 44, thus forming a stop shoulder 46.

A sleeve 48, also part of the male portion of the disconnect 14 and normally carried by a strain relieving harness, not shown, encloses plunger 38 and a rear portion of sleeve 36. Forwardly of sleeve 48 is a short sleeve 50 which forms a detent lock as hereinafter described. Detent lock sleeve 50 has an annular inside flange 52 at its forward end which rides on surface 44 of sleeve 36. Interposed between the forward end of detent lock sleeve 50 and shoulder 42 is a coil expansion spring 54 which is under compression when coupling is established through disconnect 14. Sleeve 48 has formed in the outer side or surface thereof an encircling detent channel 56 in which is engaged a ball detent 58 positioned in a radial aperture 60 formed through body 30.

As shown, body 30 is reduced in its outside diameter through a rear end portion thereof whereby such rear end portion 30a has a wall thickness less than the diameter of ball detent 58. When ball detent 58 is engaged in channel 56, the periphery of the ball does not project beyond the outer surface of rear portion 30a of body 30. Of course, multiple detents and apertures can and usually will be provided.

Numeral 62 generally designates a quick release slide sleeve which encircles body 30 rearwardly of a flange 64 which forms a part of and encircles body 30 adjacent the forward end of the latter. Slide sleeve has a forward end outside an encircling pull flange 66.

Sleeve 62 is adapted to have limited longitudinal movement on body 30, its forward movement being limited by body flange 64 while its relative rearward movement is limited by a snap ring 68. A portion of the release sleeve 62 is of enlarged inside diameter and forms with the reduced rear end portion 30a of body 30 a spring chamber 70 which houses an expansion spring 72 normally maintained under compression between opposing shoulders 74 and 76 of body 30 and release slide 62, respectively.

The inner surface of release sleeve 62 has formed therein an annular locking slot 78 which is out of register with passage 60 when the disconnect is connected but which registers with passage 60 when release slide sleeve 62 is pulled forwardly against the tension of spring 72, whereby detent 58 is permitted to move outwardly into lock slot 78 to become disconnected from lock sleeve 48.

Spring 54 maintains a constant pressure against sleeve 48 and forces the ball detent outwardly into lock slot 78 when it registers with passage 60. This permits lock sleeve 48 and plunger 38 to withdraw from body 30, thus disconnecting the coupling 12, 14 and supply line 10 from the user and, with the rearward movement imparted to sleeve 36 by spring 54 and detent lock sleeve 52 check valve 34 will close. Also, detent lock sleeve 52 will ride under detent ball 58, thus preventing it from dropping back into body 30.

While a particular disconnect 14 is shown in detail, that is done by way of illustration only, it being understood that any disconnect having or susceptible of push-pull actuation can be used with my invention.

It will be apparent from the foregoing that actuation of the disconnect coupling is manually accomplished by the user grasping pull flange 66 of release slide sleeve 62 and pulling forwardly, to the right in FIG. 1. However, under conditions of great excitement or panic the user may not remember to pull sleeve 62 forwardly to release himself from the supply line 10. Accordingly, in order to automatically actuate disconnect 14 in such event there is provided in accordance with the present invention a flexible slack coupling between the release slide sleeve 62 and adaptor 18 at the opposite end of the elastic coupling section. This slack coupling embodies preferably two or more flexible cables or strands 80 which are connected at their forward ends to adapter 18. In FIG. 1 cables 80 are connected to adapter 18 by passing the forward ends of the cables through the adaptor slots 22, bending them back and securing them to the main body portions of the cables by suitable clasps 82. The rearward ends of cables 80 are connected through a ring 84 which is pressed on and encircles the body of release sleeve 62 behind pull flange 66, as illustrated in FIG. 1. While flexible, cables 80 are of fixed length and do not stretch.

The flexible, elastic coupling section 12 and cables 80 preferably are housed in an elastic corrugated tube 86 which is secured at its forward and rear ends by suitable clamping wires 88 and 90, respectively, to supply line 10 and to the disconnect 14, the secured ends of the corrugated rubber housing 86 being enclosed in boots 92 and 94, respectively. Housing 86 encloses cables 80, to keep them from getting caught or in the way as the user moves about.

As illustrated in FIG. 1, pull cables 80 have a certain amount of slack therein when the elastic coupling section 12 is in its normal unstretched condition.

In the event of a hard pull on the coupling 12, 14 as when running in an endeavor to escape, the elastic section 12 will stretch until it reaches a predetermined limit or until a predetermined number of pounds of force are applied thereto such as to take up the slack in cables 80, whereupon a sleeve 62 will be held by the taut cables 80 against further movement. This will cause sleeve 62 to retract, relative to body 30, enabling detent 58 to move out of channel 56, upon continued pull on disconnect 14 in a direction stretching section 12. This permits the user attached portion of disconnect 14 to separate from the coupling attached portion thereof, whereupon coupling 12, 14 and supply line 10 will be completely detached or disconnected from the user, automatically and without interrupting or delaying his escape.

FIG. 3 illustrates an alternative construction of the connection between the ends of cables 80' and the adaptor between the elastic section 12' and the end of supply line 10.

Numeral 96 designates a disc or collar encircling a nipple attached to coupler 18'. Disc 96 is provided with suitable openings 98 through which the ends of cables 80' pass and these ends have secured thereon swaging balls 100 which hold the ends of cables 80' from being pulled back through openings 96. The rest of the coupling can be as shown in FIG. 1, and the operation of the embodiment of FIG. 3 is the same as described in conjunction with the embodiment of FIG. 1.

From the foregoing it will be readily apparent that there is provided by the present invention a coupling apparatus which will automatically detach or disconnect the user from the supply line in the event that the user, by reason of panic or for any other reason, forgets to manually manipulate the disconnect and imposes a hard pull or strain upon the coupling.

At the same time, the coupling will not inadvertently disconnect under forces normally encountered. The amount of force required to disconnect can be varied by varying the amount of slack in cables 80, or 80', with increased slack requiring increased stretching of coupling section 12 which in turn requires a greater pulling force. I have found that the desired results can be obtained with a cable slack requiring a force of about 100 pounds on the elastic tubular section 12.

With the disconnect arrangement of my invention, an external pull is required to disconnect, and internal pressure forces will not accidentally actuate the disconnect. A standard disconnect can be used, operated in the intended manner, and operable manually as well as automatically. The resistance of the elastic section gradually builds up the disconnecting force, and the latter is applied in alinement with the disconnect fitting. The disconnect is attached to the user for direct application of force, and the disconnect operation is smooth and continuous. Also, there is no destruction of the disconnect, and the coupling 12, 14 can be retrofitted to any supply line. The disconnect is at the user, so that he will not be held if the coupling is caught.

As this invention may be embodied in several forms without departing from the spirit or essential characteristics thereof, the present embodiments are therefore illustrative and not restrictive. The scope of the invention is intended to be defined by the appended claims rather than by the description preceding them, and all changes that fall within the metes and bounds of the claims or that form their functional as well as conjointly cooperative equivalents, are therefore intended to be embraced by those claims.

I claim:

1. Life support apparatus for supplying fluid to a user comprising an inner elastic tubular section, an outer elastic tubular section co-extensive with said inner section, means for connecting corresponding ends of said sections to a fluid supply line, a disconnect coupling attached to the other ends of said sections and having a releasable latching means adapted for connection to a user, a flexible cable carried between said tubular sections, said cable being attached at one end to said connecting means and at its other end to said releasable means, said cable having substantial slack when said sections are in normal unstretched condition and operable to actuate said releasable means upon predetermined stretching of said inner section and take-up of said cable slack.

2. Life support apparatus according to claim 1 wherein said disconnect coupling has a tubular body and said releasable means includes a sleeve slidable on said body, said sleeve being yieldingly held in a latching position and slidable out of said latching position toward said elastic section for disconnecting said coupling from the user, said cable being connected at its said other end to said sleeve.

3. Life support apparatus according to claim 2 wherein said slidable sleeve has an encircling flange and said means connecting said other end of said cable to said sleeve comprises an annulus encircling said sleeve behind said flange and having the cable end looped around said annulus, and said means connecting said sections to a fluid supply line including an adapter connecting between such fluid supply line and said inner section, said adapter having a slot with said one cable end being passed through said slot and secured therein.

4. Life support apparatus according to claim 2 wherein said connecting means includes an adapter connecting between such fluid line and said inner section, an annular disc engaging and concentric with said adapter and having an aperture through which said one end of said cable extends, and a swaging ball on said one cable end on the side of said disc opposite said elastic section.

5. Life support apparatus for supplying fluid to a user comprising an elastic tubular section, means for connecting one end of said section to a fluid supply line, a disconnect coupling attached to the other end of said section and having a releasable latching means adapted for connection to a user, a flexible coupling means being attached at one end to said connecting means and at its other end to said releasable latching means, said flexible coupling being longer than the unstretched length of said elastic section and having substantial slack when said section is in its normal unstretched condition, said section being capable of elastic elongation between its unstretched length and a predetermined greater length without releasing said latching means, thereby accommodating normal forces on said apparatus, and said flexible coupling means accommodating elastic elongation of said tubular section to said predetermined length and being operable to actuate said releasable latching means only upon elongation of said tubular section beyond said predetermined length and thereby disconnect a user in response to a predetermined abnormal force on said apparatus.

6. Life support apparatus as set forth in claim 5, wherein said flexible coupling means comprise a flexible cable.

References Cited

UNITED STATES PATENTS

| 152,413 | 6/1874 | Rhinehart | 285—304 |
| 289,265 | 11/1883 | Hurly | 285—45 |
| 2,621,875 | 12/1952 | Darling | 339—16 |
| 3,023,030 | 2/1962 | Torres | 285—316 |

RICHARD A. GAUDET, *Primary Examiner.*

K. L. HOWELL, *Assistant Examiner.*